United States Patent [19]

Wilburn

[11] Patent Number: 4,602,903
[45] Date of Patent: Jul. 29, 1986

[54] ANTI-THEFT SAFETY NUT

[76] Inventor: James C. Wilburn, 201 E. Roosevelt St., Broussard, La. 70518

[21] Appl. No.: 590,327

[22] Filed: Mar. 16, 1984

[51] Int. Cl.$^4$ ............................................. F16B 39/12
[52] U.S. Cl. ..................... 411/222; 411/226; 411/427; 411/432; 411/911
[58] Field of Search ............... 411/427, 222, 223, 224, 411/226, 432, 429, 910, 911, 1, 4, 402, 27; 70/229, 230, 232; 192/67 P, 46

[56] References Cited

U.S. PATENT DOCUMENTS

| | | | |
|---|---|---|---|
| 541,159 | 6/1895 | Fleischman | 411/223 |
| 782,079 | 2/1905 | Steele | 411/224 X |
| 1,005,727 | 10/1911 | Maurice | 411/226 X |
| 1,216,954 | 2/1917 | Crowley | 411/222 |
| 1,349,491 | 8/1920 | Burton | 411/136 |
| 1,516,453 | 11/1924 | Nichols | 411/910 X |
| 2,375,325 | 5/1945 | Robertson | 411/432 X |
| 3,267,792 | 8/1966 | Yackle | 411/4 |
| 4,144,796 | 3/1979 | Richter et al. | 411/4 |

Primary Examiner—Gary L. Smith
Assistant Examiner—Rodney M. Lindsey
Attorney, Agent, or Firm—Guy E. Matthews

[57] ABSTRACT

An anti-theft nut for forward threading on a threaded member and having removal preventing means. The nut has a nut case with an axially extending skirt and two axially extending blind bores, and a bottom nut attached to the skirt to define and inner cavity. Two roll pins of different lengths are assembled within the axially extending bores. An internal nut having an engagement shoulder for engagment by the roll pins, and a bearing disposed between the internal nut and the bottom nut are assembled within the nut cavity. The longer of the roll pins extends from its bore in the nut case to engage the shoulder of the internal nut to effect the forward threading of the anti-theft nut. Unthreading of the anti-theft nut is prevented due to jamming between the bottom nut, through the bearing, with the internal nut prior to possible engagement of the longer roll pin with the opposite side of the shoulder of the internal nut. Unthreading may be effected by locating the shorter roll pin and penetrating the nut case to release the shorter pin from its bore to allow engagement of the shoulder of the internal nut. A coded nut cover allows the location of the shorter roll pin to be determined.

3 Claims, 5 Drawing Figures

ANTI-THEFT SAFETY NUT

BACKGROUND OF THE INVENTION

This invention relates generally to anti-theft devices and more particularly concerns a locking nut which cannot be removed by conventional means for use in connecting separate pieces of oil field equipment.

Conventional oil field equipment, such as a christmas tree, is dangerously exposed to theft in ordinary use. A christmas tree includes various valves and other assemblies located at the top of a well bore on the surface of the earth. The christmas tree controls the flow of oil or gas from the well bore into collection means such as a pipeline network. The various valves and other pieces of equipment are conventionally joined by bolted flanges, which are integral parts of the valves and other equipment. The christmas trees are frequently located in remote areas and are not guarded or otherwise attended to by persons who could prevent their theft. In the past it has been a simple matter for a thief to close the bottommost valve and thereby isolate the well pressure from the remainder of the christmas tree. The thief then simply unbolts the remaining valves and assemblies of the christmas tree from the bottommost valve by removing the bolts or studs in the flanged connection immediately above the bottommost valve. If necessary for portability, other bolted flange connections of the christmas tree may also be unbolted, to reduce the weight of the individual pieces. On occasion, when well conditions permit, even the bottommost valve is unbolted and stolen in a similar fashion, leaving the well bore exposed to the environment at great risk to both the condition of the well and the environment.

A desirable way of reducing or eliminating the thefts of christmas trees is to join the flanged connections of the various valves and other pieces of equipment with means that cannot be removed by conventional means. Anti-theft bolts have been designed for or adapted to this purpose in the past as in U.S. Pat. No. 4,253,509, issued Mar. 3, 1981. It discloses a theft deterrent locking nut which includes a bolt, a round headed nut, and a locking insert which is threaded into the bolt and precludes the removal of the nut from the bolt. This device is being successfully used in the oil field to deter the theft of christmas trees and other equipment, as it is very difficult to remove by a potential thief. However, even though the device is removable by an authorized person, and reuseable, such as to repair or replace the equipment at the well head, it suffers from the disadvantage that it is very difficult to remove.

Other devices also used for theft deterrent purposes on oil field christmas trees include a larger version of the automobile wheel nut disclosed in U.S. Pat. No. 3,241,408, issued to McCauley on Mar. 22, 1977. This device is a single piece nut with a round exterior and a flat end with a groove routed into the end. A wrench having a complementary raised groove is engaged with the nut in order to turn it. Although the exterior shape of the nut makes it more difficult to engage than a conventional hex nut, this one piece nut has no internal mechanism to prevent it from being removed by simply rotating the nut.

Therefore it is an object of the invention to provide an anti-theft safety nut which is difficult for thieves to remove.

It is a further object of the invention to provide an anti-theft safety nut which positively engages with a bolt and cannot be disengaged therefrom by unauthorized persons.

SUMMARY OF THE INVENTION

The present invention details an anti-theft safety nut having a plurality of component parts, three of which are threaded for engagement with a thru bolt. Further, the presently disclosed anti-theft safety nut is provided with a nut case having an internally disposed threaded section at its forwardmost end with an internally disposed axial bore extending therethrough. Such case provides a housing into which the remaining components are fitted upon assembly.

For a better understanding of the invention, and to show how it may be carried into effect, the same will now be described by way of example with reference to the accompanying drawings.

DESCRIPTION OF THE PREFERRED EMBODIMENTS

Figure 1:
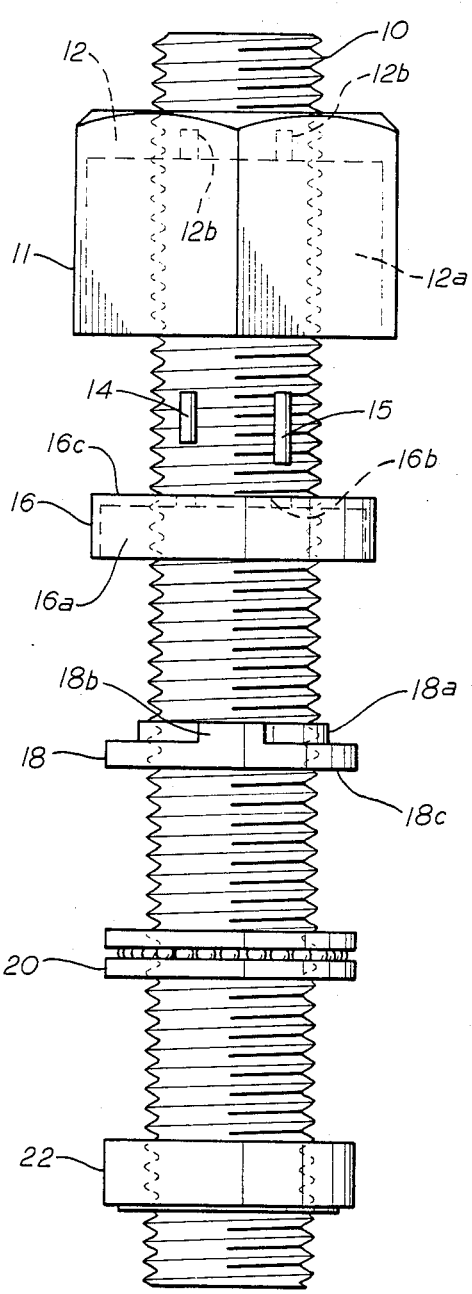
FIG. 1 is an exploded view of the component facts of anti-theft safety nut in accordance with the present invention.
Figure 3:
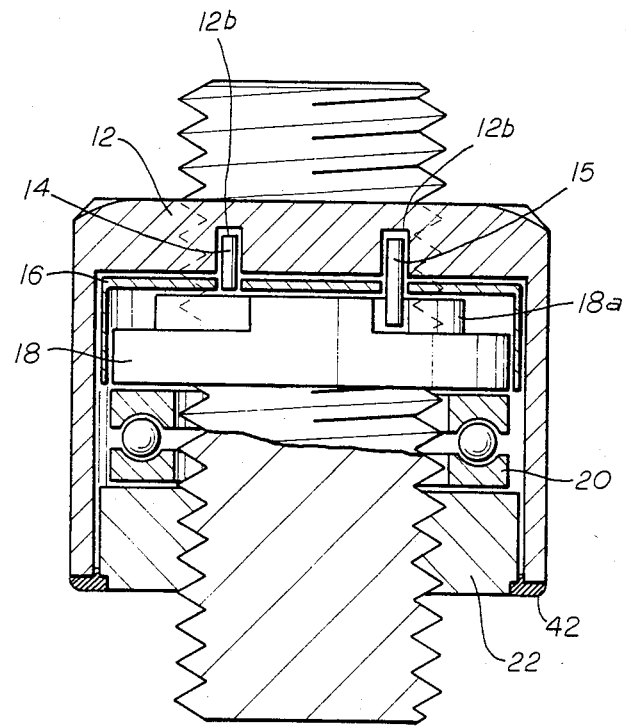
FIG. 3 is a cut-away view of the assembled safety nut of FIG. 1.
Figure 2:
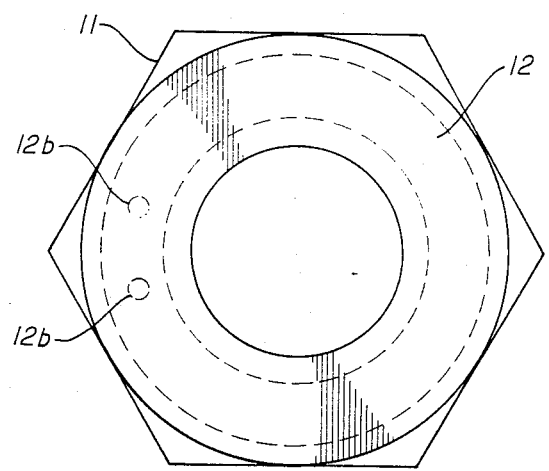
FIG. 2 is an end view of the nut case of the anti-theft safety nut of FIG. 1.

Referring now to the drawings, and first to FIGS. 1, 2 and 3, an anti-theft safety nut having three threaded elements, and which is constructed in accordance with the present invention includes a nut case 11, a pair of spring roll pins 14 and 15, an internal nut protection case 16, an internal nut 18, a thrust bearing 20, and a bottom nut 22. The terms "upper" and "lower" as used in the appended claims are referring to the parts when disposed as shown in FIGS. 1 and 3.

The nut case 11 is provided with an internally disposed threaded section 12 at its forwardmost end with an internally disposed axial bore extending therethrough. The remainder of the nut case 11 is adapted to provide a housing 12a into which the remaining components are to be fitted upon assembly. Also positioned in the internally disposed threaded section 12 of the nut case 11 are two discreetly located, axially aligned blind holes 12b as shown into which are fitted the forward ends of a pair of spring roll pins 14 and 15, such roll pins being of different lengths, and being held within the holes 12b by friction. Once the spring roll pins 14 and 15 are secured within the axially aligned holes 12b of the nut case 11, an internal nut protection case 16 is axially disposed within the nut case housing 12a. The nut protection case 16 is composed of a sleeve-shaped housing 16a having bores 16b extending through the forward wall 16c thereof. Upon placement of the nut protection case 16 into the housing 12a of the nut case 11, the rearmost end of the longer spring roll pin 15 passes through a bore 16b in the forward wall 16c of the nut protection case 16, and projects into the sleeve-shaped housing 16a of the internal nut protection case 16, while the end of the shorter spring roll pin 14 only extends into a bore 16b of the forward wall 16c of the nut protection case 16. The reasons for the differing lengths of the spring roll pins utilized herein will become more apparent from a further reading of the specification as hereinafter disclosed.

The interior of the internal nut protection case 16 is specifically adapted to loosely accommodate therewithin an internal nut 18. The internal nut 18 is the second threaded element of the anti-theft safety nut disclosed herein, and details a shoulder 18a around its outer peripheral surface having an axially projecting stop means 18b provided thereupon to fit between the rearwardly projecting end of the spring roll pin 15 as it extends into the housing 16a of the internal nut protection case 16.

A ball-type thrust bearing 20 is then positioned adjacent the rear surface 18c of the internal nut 18 so as to prevent contact between the internal nut 18 and the bottom nut 22. This bottom nut 22 comprises the third, and final, threaded element of the anti-theft safety nut assembly, and forms the bottom or base thereof. When the bottom nut 22 has been appropriately screwed into its position within the nut case 11, it is then welded to the nut case with weld 42 as shown in FIG. 3.

Because of the presence of the thrust bearing 20 between the internal nut 18 and the bottom nut 22, it is virtually impossible to rotate the internal nut herein no matter how much reverse torque is applied. In order for the whole assembly to turn, and thereby be removed from the thru bolt 10, the friction on the surfaces of all the safety nut components must equal the friction on the thread of the thru bolt 10. With the bearing so installed, it is not possible to transmit friction to the safety nut components, thus it is not possible to remove the safety nut.

Moreover, it is impossible to remove the safety nut through the action of the long pin 15 acting in concert with the shoulder 18b of the internal nut 18. While the shoulder 18b permits the long pin 15 to slip in the reverse direction, it would be necessary to rotate the long pin 15 approximately 300° in order to engage the other surface of the shoulder 18b to remove the safety nut. Because of the clearance between safety nut components, a rotation of only about 60° may be achieved, thereby preventing rotation of the long pin 15 to the other surface of the shoulder 18b.

Figure 4:
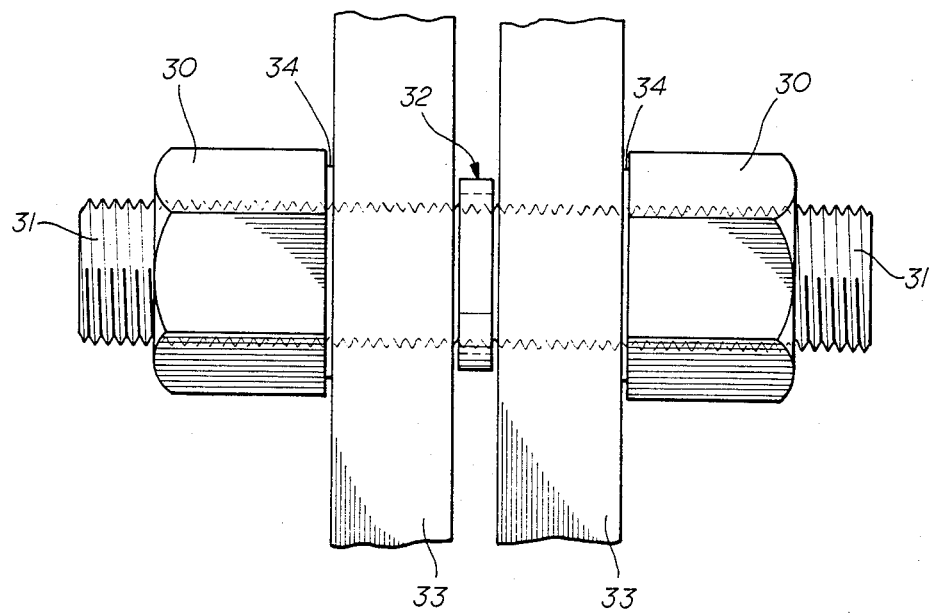
FIG. 4 details another embodiment of the present invention wherein two safety nuts are disposed on a single thru bolt for fastening together flange means having multiple, case hardened steel washers installed therebetween.
Figure 4:
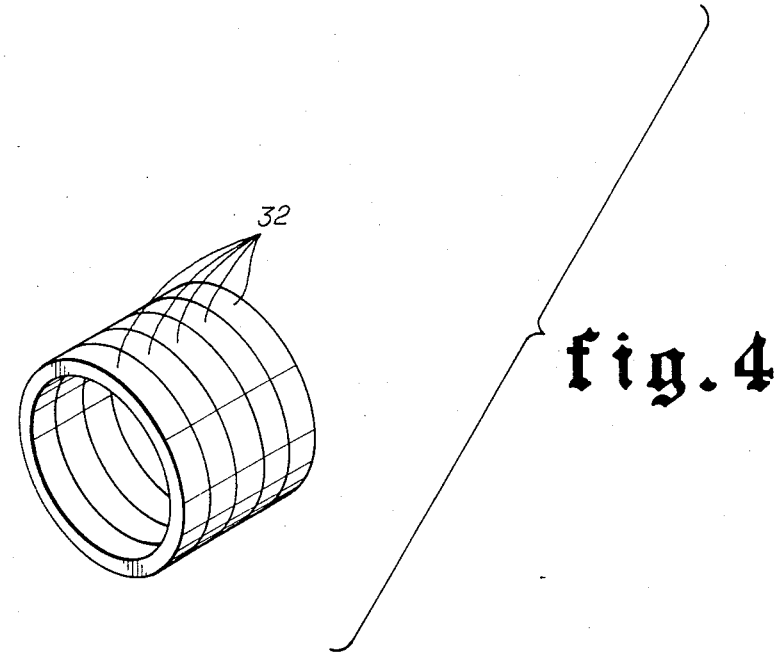

FIG. 4 illustrates another element of the present invention wherein two anti-theft safety nuts 30, as detailed in FIGS. 1-3, are installed on a single thru bolt 31. This embodiment of the invention incorporates the utilization of multiple, case hardened steel washers 32 of varying thickness fitted around the thru bolt 31 in the exposed area between the components 33 being fastened together, e.g., flanges or valves. Pressure seals, as at 34, may be installed between the anti-theft safety nuts 30 and the components 33 to be fastened. Preferably, the thickness of the washer 32 is slightly less than the exposed area between the components so as to allow the washers 32 to rotate around the thru bolt 31 should an attempt be made to cut through the washer 32 to the thru bolt 31. Experiments have proven that it is virtually impossible to cut these washers with friction-type cutting tools.

Figure 5:
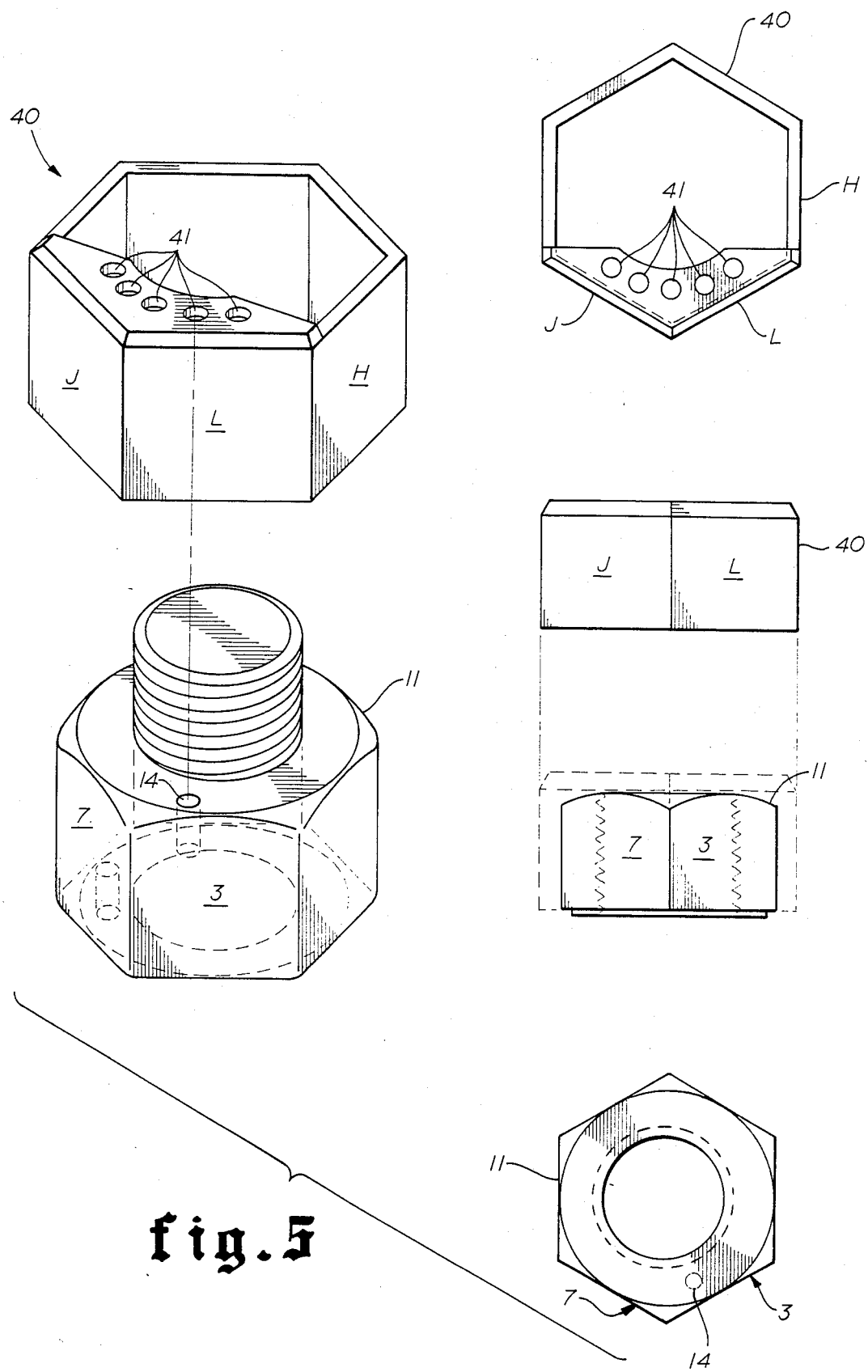
FIG. 5 is an elevational perspective view detailing a locking pin locator nut cover with letter-coded flats and numbered rear holes, and a nut having a locking pin hole and coded nut flats.

FIG. 5 is another embodiment of the invention which is designed to locate from the outside, a discretely located internal unlocking pin. Herein, during manufacture of the lock nuts, and after the spring roll pin holes have been machined inside the nut case 11, a blank nut cover 40 having a plurality of holes 41 (five (5) in this instance) is placed around the nut case 11. After determining which of the five (5) holes 41 in the back of the nut cover 40 is in alignment with the unlocking spring roll pin hole for the shorter pin 14, the nut case 11, and nut cover 40 are coded as desired.

When the nut cover 40 is placed over the nut case 11, the nut cover flats J and L covering the nut case flats 3 and 7, the number 2 hole on the back of the nut cover 40 is in alignment with the unlocking spring roll pin 14.

In order to remove the safety nut in this case, it is necessary to remove the nut cover 40, grind a hole into the nut case 11 at the appropriate spot, grind a ⅛" hole with a grinder, take a ⅛" punch, stick the punch into the hole, and hit the punch to extend the short spring roll pin 14 a distance of ⅛ inch through the bore 16b of the internal nut protection case 16 so that it will contact the shoulder 18b of the internal nut 18. The nut case 11 will then be capable of transmitting appropriate friction to all of the safety nut components so as to back the safety nut off of the thru bolt 10.

What is claimed is:

1. A safety nut comprising in combination:
   (a) a polygonal nut case having an upper threaded end with a threaded bore extending axially therethrough and also having a lower enclosure housing;
   (b) said nut case defining two discretely located blind holes axially defined into said threaded end from within said enclosure housing;
   (c) a pair of spring roll pins of different lengths with first ends of said pins being mounted within said blind holes to extend different lengths from said threaded end into said enclosure housing;
   (d) an internal nut protection case disposed within said enclosure housing and including a housing sleeve and an upper wall located adjacent said threaded end, said upper wall having through holes adapted to pass said spring roll pins and a centrally disposed threaded bolt;
   (e) an internal threaded nut including a shoulder around its periphery, said internal threaded nut being disposed within said housing sleeve, said shoulder including an axially projecting stop means adapted to fit between the lower projecting ends of said spring roll pins;
   (f) a thrust bearing disposed adjacent the lower surface of said internal threaded nut; and
   (g) a bottom nut disposed adjacent the lower side of said thrust bearing and welded to the lower end of said enclosure housing.

2. The combination of at least two of the safety nuts of claim 1 wherein said safety nuts are threaded onto a single through bolt for holding members together, said members having at least one case hardened steel washer disposed therebetween.

3. The safety nut of claim 1 wherein the nut flats of said polygonal nut case are coded, and wherein a nut cover is adapted to fit over said nut case, said nut cover having cover flats coded to match said nut flats and having holes defined in the top of said nut cover with locations coded to match the location of one of said spring roll pins as disposed in said nut case threaded end.

* * * * *